G. J. HOSKINS.
COORDINATED SPHERICAL RADIAL GEAR ADAPTED TO TRANSMIT ROTARY MOTION IN THE SAME AXIAL LINE OR AT AN ANGLE.
APPLICATION FILED NOV. 12, 1915.
1,241,118.
Patented Sept. 25, 1917.
3 SHEETS—SHEET 1.
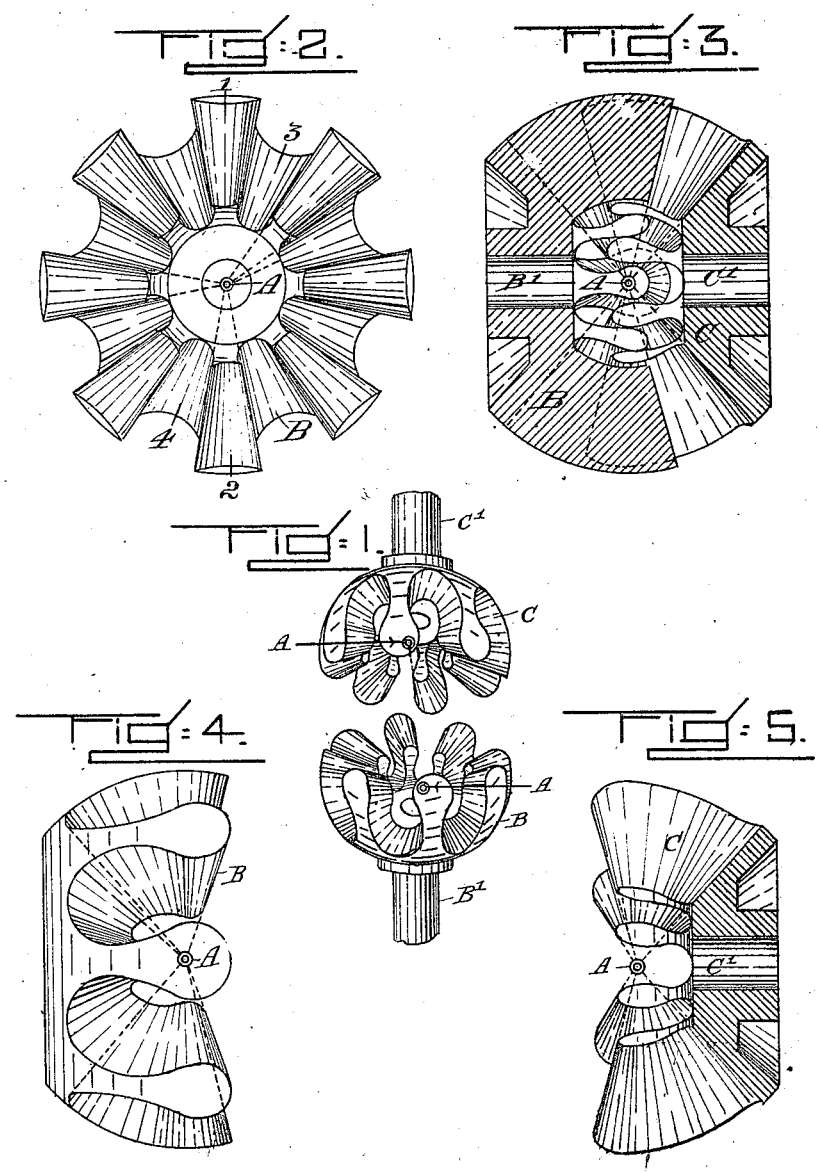

G. J. HOSKINS.
COÖRDINATED SPHERICAL RADIAL GEAR ADAPTED TO TRANSMIT ROTARY MOTION IN THE SAME AXIAL LINE OR AT AN ANGLE.
APPLICATION FILED NOV. 12, 1915.
1,241,118.
Patented Sept. 25, 1917.
3 SHEETS—SHEET 2.
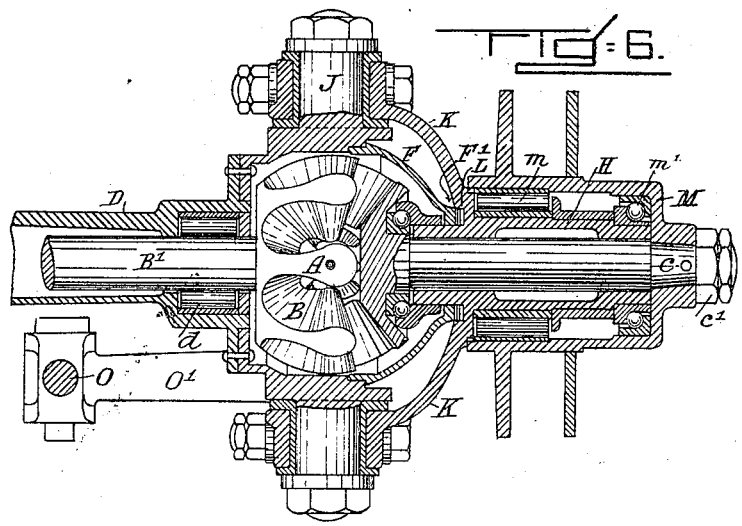
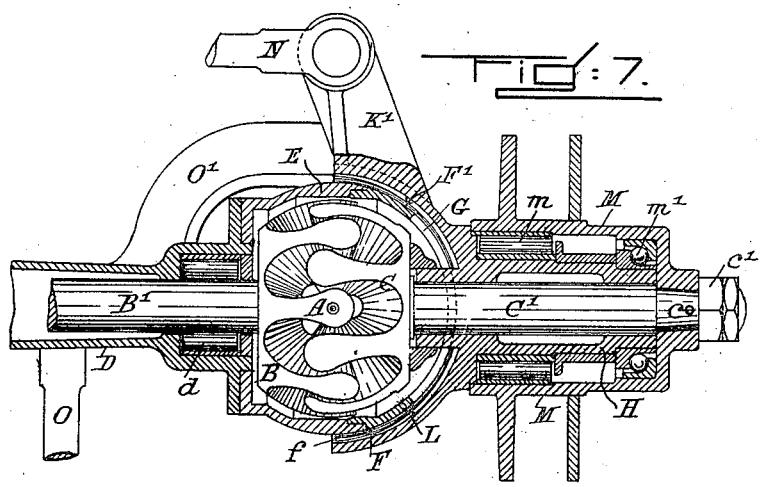
INVENTOR;
George John Hoskins
By Wm. Wallace White
ATTY.

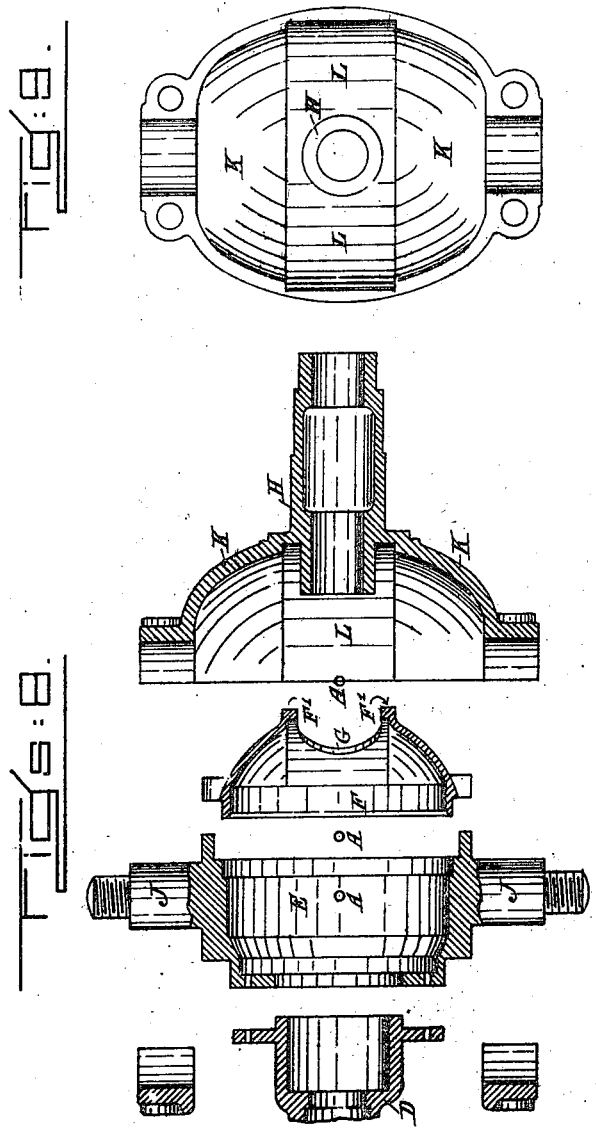

UNITED STATES PATENT OFFICE.

GEORGE JOHN HOSKINS, OF BURWOOD, NEW SOUTH WALES, AUSTRALIA.

COÖRDINATED SPHERICAL RADIAL GEAR ADAPTED TO TRANSMIT ROTARY MOTION IN THE SAME AXIAL LINE OR AT AN ANGLE.

1,241,118.   Specification of Letters Patent.   Patented Sept. 25, 1917.

Application filed November 12, 1915. Serial No. 61,071.

*To all whom it may concern:*

Be it known that I, GEORGE JOHN HOSKINS, M. I. M. E., subject of the King of Great Britain & Ireland, residing at "St Cloud," Burwood Road, Burwood, New South Wales, Australia, have invented new and useful Improvements in Coördinated Spherical Radial Gear Adapted to Transmit Rotary Motion in the Same Axial Line or at an Angle, of which the following is a specification.

The object of this invention is to provide coördinated gears of the crown type, for transmitting rotary motion from a relatively fixed shaft to a movable shaft in the same axial line with the relatively fixed shaft, or at an angle thereto, such movable shaft being adapted to move in one plane only, so that the axis of the movable shaft may be enabled to be placed, within certain specified limits, at an angle to the axis of the fixed shaft. These conditions necessitate teeth of a very peculiar conformation.

The adjacent extremities of each shaft will terminate in crown-gear members the teeth of which intermesh, while the external conformation of the intermeshed members will constitute a sphere the center of which will be the point of intersection of the axial lines of the shafts of the two members when the movable member is at an angle with the relatively fixed member. When viewed from with-out and looking toward the center of the sphere, each tooth will present a bulbous appearance, in cross section, that is to say, there will be a semi-circular head tapering down, below the center from which it is struck, to a thinner shank, and then sweeping down toward the root of the tooth with semi-circular curves to the right and left until each curve merges into the shank of the adjacent tooth on that side. Every part of the frictional surfaces of each tooth will be radial with the center of the sphere of which it is a part.

The spherical radial gear, which constitutes the present invention, will be adapted to transmit rotary motion either in a continuous straight line or at an angle, preferably, not exceeding 30 degrees, in any horizontal direction from the normal axial line. This can only be effected if the geometrical figure, upon which the gearing is based, be a sphere. When the teeth of two of these coördinated gear wheels are intermeshed, their united contour will be spherical, and all the lines, which, combined, form the periphery or faces of the teeth, will be radial from the center of the sphere. The sphere will be hollow, the teeth being formed, medially between the two poles, out of the shell of the hollow sphere; the teeth, when viewed from the side or from the top, will present a bulbous appearance, tapering toward the center of the sphere. The periphery of the teeth will be one continuous serpentine curve from the starting point back to the starting point. The starting point may be at any part of the continuous curve. When the coördinated spherical radial gear is to be applied to do work, it will be inclosed within a spherical casing, and means will be provided for connecting one axle with the other axle, so that one or both of the axles may be adapted to move in one plane, to a limited extent, about the center of the coördinated spherical gear, and maintained in that position so long as it may be thought desirable.

But in order that the invention may be thoroughly understood, reference will be made to the accompanying sheets of drawings, in which:—

Figure 1, is a perspective view of the two coördinated members of the gearing, separated, so that their conformation and construction may be clearly seen and apprehended.

Fig. 2 is a plan of one of the gear wheels, showing some of the radial lines from the center of the sphere.

Fig. 3 is a vertical section of the meshed coördinated gear wheels, taken on the line 1—2 of Fig. 2.

Fig. 4 is a side elevation of one of the gear wheels, showing some of the radial lines which start from the center of the sphere, which, throughout, is marked with a double circle, for indentification purposes.

Fig. 5 is a vertical section of one of the coördinated gear wheels, taken on the line 3—4 of Fig. 2.

Fig. 6 is a longitudinal vertical section of the coördinated gear, and the casing therefor, as applied to the front wheels of an automobile, and viewed from the rear.

Fig. 7 is a longitudinal horizontal sectional plan of the same, the section being taken at right-angles to that shown in Fig. 6, Fig. 8 shows the several parts of the gear-casing and bracket separated, so that their construction may be better apprehended.

Fig. 9 is an elevation of the interior of the bracket.

The two gear wheels, which constitute the spherical radial gear adapted to transmit motion in the same axial line or at an angle, are identical in shape and construction. One of these gear wheels will be keyed on a relatively fixed axis, while the other will be keyed on an axis which may be moved in any horizontal direction, so as to form an angle (preferably not greater than 30 degrees) with the relatively fixed axis. When the two gear wheels are intermeshed they will, together, form a hollow sphere, the shell of the sphere being cut, medially between the poles, to a continuous serpentine curve outlining bulbous-headed, intermeshing teeth of peculiar conformation. The lines, which form the contour of the teeth, will radiate from the center of the sphere, and will terminate in the serpentine line on the surface of the sphere. The center of the sphere, from which all the lines that constitute the sides of the teeth will radiate, is marked A, and is inclosed within two small circles, so that the starting point of the radial lines may be readily identified. On the surface of the sphere, the point or head of each tooth will present a bulbous appearance, curving inward to a neck, then curving outward toward the roots of adjacent teeth, then curving upward toward the necks of the next teeth, and so on throughout the entire circle of teeth. The contour of the teeth will therefore form one continuous serpentine curve throughout, the solid formation tapering toward the center, as will be clearly seen by referring to the dotted lines radiating from the center and indicated on Figs. 2 to 5.

Referring particularly to Figs. 1 to 5, inclusive, B is the gear-wheel keyed on the relatively fixed axis, and C the gear-wheel keyed on the movable axis. At whatever angle the movable axis may be placed, relatively to the fixed axis, its central axial line will always point direct to the center of the sphere, which will never vary. $B^1$ is the relatively fixed axis, and $C^1$ is the movable axis. When the axis $C^1$ is inclined to the axis $B^1$, the bulbous part or head of the most enmeshed tooth on the wheel B will engage with the neck of the tooth in advance on the coördinated gear-wheel C, and the neck of the tooth on the coördinated gear-wheel B will engage with the bulb or head of the tooth immediately behind it on the gear-wheel C. An examination of the intermeshing teeth, as illustrated in Fig. 4, will show that when the teeth are viewed from the outside and looking toward the center of the sphere, each tooth will have a bulbous appearance, which characteristic shape is maintained throughout its cross-section; that is to say, each tooth will have a semi-circular head which tapers down to a thinner shank, which, in turn, is defined by two outward semi-circular curves merging into the shanks of the adjacent teeth, the frictional surfaces following the curves being in every part radial with the point A, as shown by the broken lines in the several figures. When the teeth of the two gears are intermeshed, so that the axial line of the movable shaft $C^1$ intersects the axial line of the relatively fixed shaft $D^1$, at the point A, the two gears will form a sphere, of which the point A is the invariable center, no matter what angle the movable shaft makes with the fixed shaft. It will be seen from the drawings, and particularly from Fig. 4, in which figure the semi-circular outline of the head of the tooth which lies between the observer and the sphere center A, is shown practically in true outline, that the center of the semi-circle substantially outlining the head of each tooth is so located on the sphere as to lie between the outer end of the tooth and the point where the tooth is intersected at the surface of the sphere by a plane passing through the center of the sphere and perpendicular to the axis of the shaft on which the tooth is fixed. In other words, when the two shafts are in the same axial line, the plane of the pitch-line of the member on the fixed shaft and the plane of the pitch-line of the member on the movable shaft, will coincide, and will be located intermediately between the lines of centers from which the semicircular heads of the teeth of each member are struck. It is obvious that as the rotation of the gear-wheels continues, the lines of contact of the coördinated teeth with one another will continually vary. When the maximum angle of divergence from the axial line of the relatively fixed axis has been attained, some of the teeth on each gear-wheel will be out of gear with their corresponding teeth on the coördinated gear-wheel; but others of the teeth of the coördinated gear-wheels will be more deeply enmeshed than before, persistently maintaining complete wearing contact with their coördinated teeth throughout their entire width. This distribution of wearing surface is due to the spherical radial shape of the teeth of the coördinated gear-wheel. It has been found that good results are obtained when, in gearing of, say, six inch diameter, the plane of the pitch-line will be 3/32 of an inch below the plane of the centers from which the semi-circular heads of the teeth are struck; the two planes or lines of centers will therefore be 3/16 of an inch apart with the planes of the pitch-lines coinciding and intermediate between the two planes or lines of centers. It will of course be understood that if the axial lines of the two shafts are at an angle, the plane of the pitch-line of the gear on the movable shaft will become oblique to the plane of the pitch-line of the gear on the fixed shaft, the two planes of the pitch-lines intersecting at points at right angles to the plane of movement of the movable shaft. It may aid in fully understanding the invention to state that it is a fact which may be proved by experiment, and which has been proved, that when the movable shaft is at an angle to the fixed shaft, the only teeth of the two members which will be in frictional contact, doing work, will be the pairs of teeth, two on each member, which are about the points of intersection of the planes of the pitch-lines. These points of intersection of the planes of the pitch-lines of the two members never vary, no matter what the obliquity of the two planes, relative to one another, may be.

When the coördinated gear-wheels, as above described, are to be applied to practical uses, it is obvious that the movable axis must be so connected to the relatively fixed axis that it shall be adapted to move to the limited extent herein before-mentioned in a horizontal arc, concentric with the coördinated gear-wheels; but shall be so confined or limited in these movements that the intermeshed gear-wheels cannot be entirely separated from one another. To this end, a spherical casing has been devised, in which to inclose the coördinated gear-wheels. In the drawings, the invention is shown as applied to the fore-wheels of an automobile.

Referring particularly to Figs. 6 to 9 inclusive relatively fixed axle $B^1$ is inclosed within a casing D, in which are roller bearings $d$, to reduce friction; connected to the flanged end of the shaft-casing D is the part E of the gear-casing; this part is as nearly semi-spherical internally as its construction will permit; this part of the casing partly incloses the relatively fixed gear-wheel B; to the part E is attached the remaining part F of the spherical gear-casing, the part F being semi-spherical in contour, with a circular band $F^1$ around its central part, the surface of the circular band being extended on to the part E. In the part F is a slot G, through which the bearing H of the movable axial shaft $C^1$ will pass; the band $F^1$ and the slot G will lie between horizontal planes. A good idea of this construction will be obtained by referring to Figs. 8 and 9, where the parts are shown drawn to an enlarged scale, and are uncovered. Projecting from the upper and lower sides of the part E are gudgeons J, J, the axis of the same passing vertically through the center A of the sphere; a bracket piece K is pivoted on the gudgeons J, J, and is adapted to revolve thereon in a horizontal plane; mediately between the upper and lower ends of the bracket is a semi-circular recess L, that is adapted to receive the band $F^1$, when all the parts (as shown on Sheet IV.) are connected together; the small annular space $f$, which will be left between the bottom of the recess L and the face of the band $F^1$, will be packed with a spring packing of any suitable kind. The central part of the bracket-piece K will be extended in tubular form toward the rear and inward toward the center of the gear-casing, such tubular part constituting bearings H for the movable axial shaft $C^1$. The extreme end of the axial shaft $C^1$ will be tapered at C, the hub M of the automobile wheel will, at its outer end, make a tight fit with the taper $c$, and will, moreover, be keyed thereon, so that the wheel shall rotate with the axial shaft $C^1$; the two parts will be secured together by the nuts $c^1$. Roller bearings $m$ and ball bearings $m^1$ will reduce to a minimum the friction between the interior of the hub and the external surface of the bearing H. Projecting from each bracket K is a bracket arm $K^1$. The bracket arms $K^1$ (one of which is associated with each of the movable axial shafts $C^1$) are connected together by a rod N, so that the circular movements of the brackets and the annular movements of the axial shafts $C^1$ shall synchronize. The steering will be effected by moving the rod O backward or forward, as desired; this backward or forward movement will be communicated to the brackets K through the bracket arm $O^1$, which insures connection with only one of the bracket pieces K, the other bracket piece being caused to move simultaneously about its center J, through the agency of the bracket arm $K^1$ and the connecting rod N. Rotary motion will be communicated to the relatively fixed axial shaft $B^1$, by any suitable apparatus, in a manner that is well understood. The gear-casing will be filled with any suitable lubricant; the grease used for lubricating railway wheels would be adapted to the purpose. The gear-casing will not only confine the lubricant within its proper sphere, but it will also prevent dust, grit, and other objectionable matter from reaching the gear wheels themselves.

I claim—

1. A spherical radial gear for transmitting motion from one shaft to an intersecting shaft arranged at a variable angle thereto, comprising intermeshing gear members disposed on said shafts with their centers coincident with the point of intersection of the axes of the shafts, said gear members having teeth, the elements of the faces of which radiate from said centers, and the center lines of which faces are equidistant from the said centers, the outlines of said teeth being such that the teeth are widest at the plane through the center of the sphere at right angles to the shafts when the latter are in line, and have the ends rounded above and the roots tapered below this plane so as to allow of all teeth in mesh having a smooth bearing against the adjacent tooth for all the various angular positions of the shafts.

2. A spherical radial gear for transmitting motion from one shaft to an intersecting shaft arranged at a variable angle thereto, comprising intermeshing gear members disposed on said shafts with their centers coincident with the point of intersection of the axes of the shafts, said gear members having teeth, the elements of the faces of which radiate from said centers, and the center lines of which faces are equidistant from the said centers, the depth of said teeth below the pitch line being more than double that above, and the width of the tooth decreasing both above and below the pitch line to allow of all the teeth in mesh in the various angular positions of the shafts contacting smoothly with the adjacent teeth for the delivery of power.

3. A spherical radial gear for transmitting rotary motion from a relatively fixed shaft to a movable shaft in the same axial line or at an angle thereto, comprising crown gear members on the shafts and having intermeshing teeth, the said crown gear members having teeth with heads semi-circular in cross section, each semi-circular head tapering down to a thinner shank, and then by semi-circular curves merging into the shanks of the next teeth, the frictional surfaces of the teeth thus formed being in every part radial from the center of the sphere, whereby one gear member may be rotated to drive the other in various angular positions of the movable shaft relative to the fixed shaft, the parts being so designed that all the teeth of both members may be intermeshed at once and when so intermeshed the two crown gear members together form a sphere the center of which coincides with the point of intersection of the axial lines of the shafts when the movable shaft is at an angle to the relatively fixed shaft, as and for the purposes herein set forth.

4. A spherical radial gear for transmitting rotary motion, from a relatively fixed shaft to a movable shaft in the same axial line or at an angle thereto, comprising crown gear members having intermeshing teeth with heads semi-circular in cross section, each semi-circular head tapering down to a thinner shank, and then, by enlargement, merging into the shanks of the next teeth, the frictional surfaces of the teeth thus formed being, in every part, radial with a point formed by the intersection of the axial lines of the two shafts when they are at an angle, the pitch-line of the crown gear teeth when the two shafts are in the same axial line being intermediate between the rows of centers from which the semi-circular heads of the teeth are struck, the parts being so designed that when the two shafts are at an angle the two pitch-lines intersect at opposite points at right angles to the plane of movement of the movable shaft and at which two opposite points the corresponding teeth of the two members of the spherical gear will be in frictional contact, substantially as described.

In testimony whereof I have signed my name to this specification in the presence of two subscribing witnesses.

GEORGE JOHN HOSKINS.

Witnesses:
P. MASSEY,
CLAUDE MEILLOR.